United States Patent [19]

Jaeger

[11] 3,722,037
[45] Mar. 27, 1973

[54] LOCATING PLUG

[75] Inventor: Joseph H. Jaeger, Indianpolis, Ind.

[73] Assignee: Illinois Tool Works Inc., Chicago, Ill.

[22] Filed: Aug. 23, 1971

[21] Appl. No.: 178,518

[52] U.S. Cl. .................................24/73 PF, 85/80
[51] Int. Cl. ......................A44b 21/00, F16b 13/04
[58] Field of Search .....16/2; 24/213 CS, 214, 213 B, 24/213 R, 73 FT, 73 R, 73 MF, 73 PF, 73 HS, 73 P, 73 D, 73 B, 73 PM, 73 AP; 85/5, 80, DIG. 2

[56] References Cited

UNITED STATES PATENTS

| 2,366,274 | 1/1945 | Luth et al | 85/DIG. 2 UX |
| 3,210,030 | 10/1965 | Ramsey et al | 85/5 R X |
| 3,444,596 | 5/1969 | Soltysik | 24/73 SA |
| 3,651,734 | 3/1972 | McSherry | 85/80 |

FOREIGN PATENTS OR APPLICATIONS 1,450,677  7/1966  France ......................................85/80

Primary Examiner—Donald A. Griffin
Attorney—J. R. Halvorsen

[57] ABSTRACT

A locator plug in initial form of a one-piece plastic fastener of the type having an enlarged head at one end of a shank with wings or arms diverging from the opposite end of the shank toward the head and adapted to be passed through apertures in two or more workpieces such as sheet material panels or other structural members which are trapped between the head and the wings; and with the wings joined to the adjacent end of the shank by hinge connections affording maximum pivotal movement of the wings from positions substantially parallel to the shank to positions substantially normal thereto.

2 Claims, 6 Drawing Figures

PATENTED MAR 27 1973 3,722,037
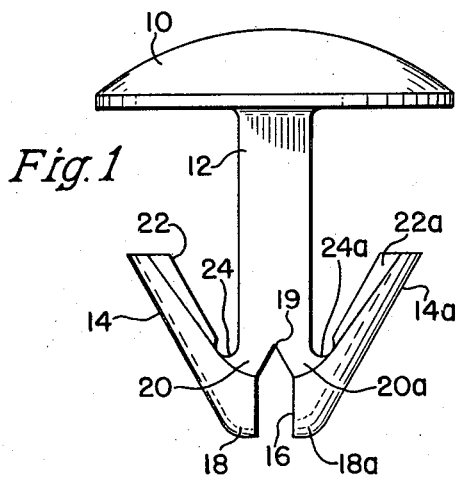
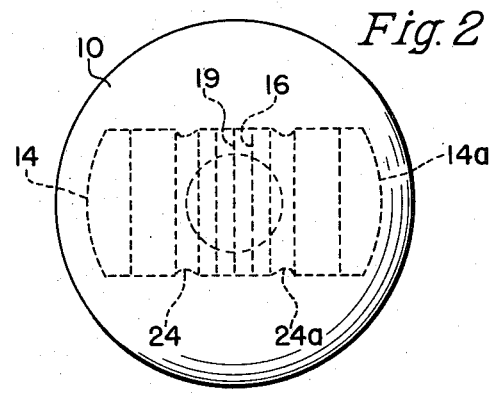
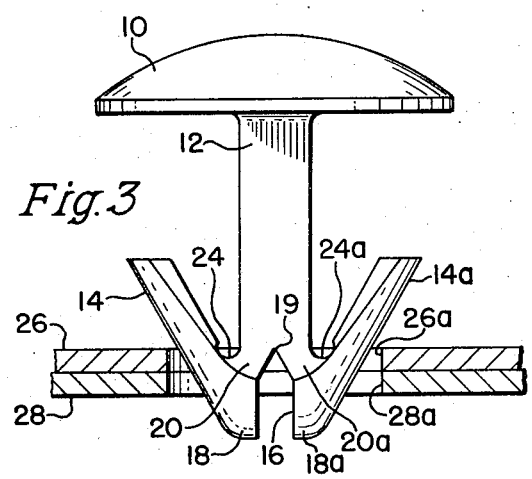
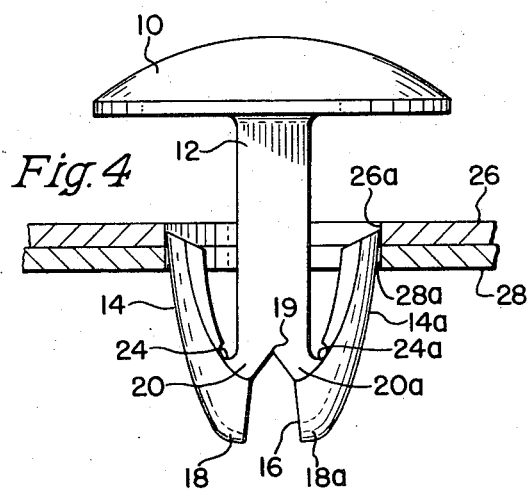
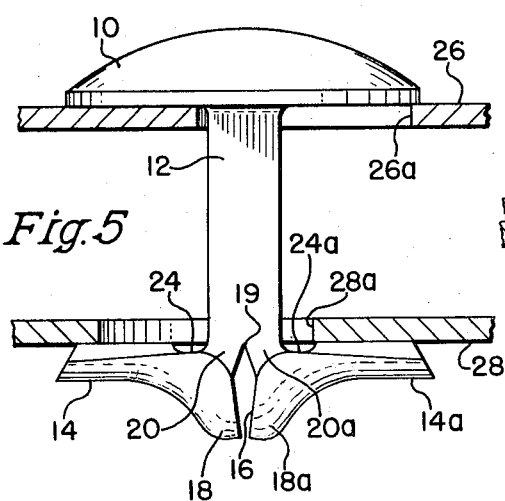
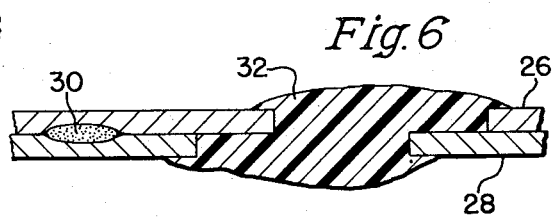
INVENTOR.
Joseph H. Jaeger
BY
His Att'ys

LOCATING PLUG

PRIOR ART

There are various forms of prior art fasteners of the so-called threadless or snap type which include a shank with a head at one end thereof and wings or arms at the opposite end thereof diverging toward the head. These fasteners are normally dimensioned for particular hole sizes in a panel or panels as the case may be. With multiple panels, the panel apertures are accurately sized and aligned for collapsed passage of the wings therethrough which wings then expand outwardly with the ends thereof or shoulders thereon in position to engage the blind face of the innermost panel to secure the same in abutting surface contact with the next adjacent panel. The same type of fastener is often employed for mounting some device, such as a molding strip, wall hook, shelf and the like to a single panel which is apertured to receive the shank and wings in the manner described above.

This invention is concerned with fasteners of the above general type but with additional uses such as pre-assembly of multiple apertured panels or other structural members in which the apertures are not necessarily similarly sized, nor positioned in precise alignment. Such pre-assembled panels or the like may then be moved together to a work station, such as a jig clamp for a welding operation, or relatively shifted within limits to position for such a welding or other operation.

An object of the invention is to provide such a fastener for use in pre-assembling members with oversize or differently sized apertures permitting substantial lateral movement of the apertured members or the fastener while maintaining the members in pre-assembled relationship.

Another object of the invention is to provide such a fastener with a substantial amount of permissive movement of the wings from collapsed positions to laterally extending positions trapping the included aperture members between the wings and the head.

A further object of the invention is to provide such a fastener in which the integral hinge connections between the wings and the shank are such as to permit movement of the wings from positions generally parallel to the shank as when passed through the member apertures, to positions generally normal to the shank under influence of the weight of a lower member or members when transferred in pre-assembled relation to a work station, and with the lateral extent of the wings being at least equal to the lateral extent of the head to maintain the pre-assembly even with substantial lateral offsetting of oversize apertures to substantial out-of-line relation.

The invention still further aims to provide a fastener substantially of the above type permitting abutting clamping of the members with the apertures substantially out-of-line in position for welding wherein welding at a point proximate to the apertures will result in heat dissipation of the fastener to form a sealing plug for the apertures.

In the accompanying drawing:

FIG. 1 is an elevation of the one-piece plastic fastener;

FIG. 2 is a top plan view of the fastener of FIG. 1;

FIG. 3 is an elevation of the fastener in position to be passed through apertures in panel members shown in section;

FIG. 4 is a view similar to FIG. 3 showing the collapsed position of the wings as the fastener is passed through the panel apertures;

FIG. 5 is a view similar to FIGS. 3 and 4 but showing pre-assembled panels with the weight of the lowermost panel spreading the wings and trapping the panels with the apertures out-of-line; and FIG. 6 is a view showing the spot welding of abutted panels with the fastener heat dissipated to plug the apertures.

With reference to FIGS. 1 and 2 of the accompanying drawing, the fastener or locator plug is a molded one-piece plastic article and includes a relatively large head 10 with a rectangular shank 12 projecting from the under face thereof and terminating in a pair of wings or lugs 14, 14a which normally diverge from one another toward the head 10. There is a relatively wide slot 16 at the free end of the shank dividing the same to present substantially rigid entering ends 18, 18a of the wings 14, 14a, respectively, and terminating at an apex 19. The apex 19 is located within the shank at a position to present integral hinge areas 20, 20a joining the wings to the shank. The slight curvature of the outside of the wings 14, 14a forms interior edge portions 22, 22a which terminate short of the shank to provide relieved transverse hinge areas 24, 24a which add to the flexibility of the wings, particularly during collapsing movement thereof when passed through workpiece apertures.

With reference to FIGS. 3 and 4, two workpieces 26, 28 are shown with apertures 26a, 28a, respectively. These workpieces may be in the form of apertured panels or other types of apertured structural members which are to be initially preassembled and then transported to a work station where they are accurately positioned and clamped, as in a jig, for a welding or similar operation to secure the same in abutting relation at least in the area adjacent to the apertures therethrough. In FIG. 3, the workpieces 26, 28 are initially positioned with the apertures 26a, 28a in communication with one another, though not necessarily in exact alignment and the locator plug or fastener is positioned as shown in this figure with the entering ends 18, 18a thereof passed through the workpiece apertures and the wings 14, 14a in normal spread position. Thereafter, the fastener plug is driven inwardly to collapse the wings toward parallelism with the shank as they pass through the apertures. The wings are themselves slightly flexible from the hinge areas 20, 20a outwardly for this purpose. The relieved areas 24, 24a facilitate this collapsing movement, as does the slot 16 which is enlarged as shown in this figure. After the wings pass through the apertures, they will spread out with the free inner ends located on the blind side of workpiece 28, thus trapping the workpieces between the wings and the head 10.

After such pre-assembly, and with reference to FIG. 5, the wings 14, 14a may be forcibly deformed to positions generally normal to the shank or the weight of a workpiece may cause this deformation to continue to trap the workpieces during handling or transport even though the workpiece apertures 26a, 28a may become quite substantially out-of-line as shown. With such oversize apertures, as distinguished from accurately sized and aligned apertures in panels to be secured together, shifting of the workpieces to positions as in FIG. 5 still results in their being trapped in pre-assembly. Depending upon the length of the shank and the thickness of abutted workpieces to be preassembled, the wings can assume the lateral extent of the head, or even more, in order to maintain the pre-assembly of the workpieces. In the laterally spread positions of the wings in FIG. 5, the function of the wide slot 16 becomes clear in its reversal from FIG. 4 to almost a collapsed position which permits the wide range of movement of the wings where one of the wings will span the aperture, for example 28a, even though materially misaligned with the aperture 26a, for trapping purposes.

The pre-assembly of FIG. 5, and there may be additional workpieces in the assembly, is then moved to a clamping jig in which the workpieces, or at least portions thereof in the region of the apertures, are brought into face-to-face abutting relation, and otherwise oriented to desired final position, clamped, and spot welded as at 30. Due to the welding heat, the locating fastener plug will lose its identity by melting and form a glob 32 of plastic material sealing the apertures 26a, 28a.

I claim:

1. A one piece plastic locating fastener plug for pre-assembling a plurality of apertured workpieces prior to orienting said workpieces to a fixed final position, including a shank having an enlarged head at one end thereof and a pair of wing members in the opposite end thereof with the free ends of said wing members diverging from one another toward said head, said shank having a relatively wide axially extending generally parallel sided slot opening through the entering end of said fastener including both the shank and its juncture with the wing members thereby presenting spaced tapered entering end sections on each wing member, the closed end of said slot being apical in configuration and forming thinned diverging adjacent shank portions which act as resilient hinge connections between the unslotted shank portion and the wing members thereby permitting substantial collapse of the wing members to positions substantially parallel with the shank when forced through the workpiece apertures with the resultant spread of the entering end sections and widening of said slot while said wings traverse said apertures until the free ends of said wings have cleared said apertures, said slots further permitting reverse spreading movement of the free ends of said wing members on the blind side of the workpiece pre-assembly whereby the free ends of said wing members assume positions substantially normal to the shank and with the approach of the end sections toward one another substantially closing said slot and trapping the workpiece in pre-assembly, a first portion of said wing members having a substantial length extending from the free ends thereof, being thickened to create rigidity therein and an intermediate portion of said wing members between said thickened portion and the juncture with said shank hinge connection being transversely relieved to increase flexibility of the hinge connections to thereby assist in permitting the distention of the wings to the position normal to the shank.

2. A locating fastener plug as claimed in claim 1, wherein the combined lengths of the wing members are at least as great as the transverse extent of the head in positions normal to the shank whereby to maintain the pre-assembly with relatively large workpiece apertures which may be substantially misaligned.

* * * * *